(12) United States Patent
Vauchel

(10) Patent No.: US 8,668,441 B2
(45) Date of Patent: Mar. 11, 2014

(54) DEFORMABLE STRUCTURAL FRAMEWORK FOR A TURBOFAN NACELLE

(75) Inventor: Guy Bernard Vauchel, Le Havre (FR)

(73) Assignee: Aircelle, Gonfreville l'Orcher (FR)

( * ) Notice: Subject to any disclaimer, the term of this patent is extended or adjusted under 35 U.S.C. 154(b) by 955 days.

(21) Appl. No.: 12/519,088

(22) PCT Filed: Oct. 15, 2007

(86) PCT No.: PCT/FR2007/001678
§ 371 (c)(1),
(2), (4) Date: Jun. 12, 2009

(87) PCT Pub. No.: WO2008/093003
PCT Pub. Date: Aug. 7, 2008

(65) Prior Publication Data
US 2010/0024435 A1    Feb. 4, 2010

(30) Foreign Application Priority Data

Dec. 13, 2006 (FR) ...................... 06 10850

(51) Int. Cl.
*B64D 29/06* (2006.01)
*F02C 7/20* (2006.01)
(52) U.S. Cl.
USPC ........... 415/119; 415/128; 415/197; 415/200; 415/213.1; 415/227
(58) Field of Classification Search
USPC .............. 415/119, 128, 170.1, 196, 197, 200, 415/213.1, 227
See application file for complete search history.

(56) References Cited

U.S. PATENT DOCUMENTS

| 4,266,741 | A |   | 5/1981  | Murphy |
|-----------|---|---|---------|--------|
| 4,293,053 | A | * | 10/1981 | Shuttleworth et al. ........ 181/213 |
| 5,152,662 | A | * | 10/1992 | Hirst et al. ..................... 415/118 |
| 5,275,529 | A | * | 1/1994  | Langenbrunner et al. .... 415/119 |
| 5,860,276 | A | * | 1/1999  | Newton ....................... 60/226.1 |
| 6,330,985 | B1|   | 12/2001 | Manteiga et al. |
| 6,913,441 | B2| * | 7/2005  | Fadok ........................... 415/189 |

(Continued)

FOREIGN PATENT DOCUMENTS

| EP | 0 145 809 | 6/1985 |
| EP | 0155887   | 9/1985 |
| FR | 1 095 605 | 6/1955 |
| GB | 2 312 251 | 10/1997 |

OTHER PUBLICATIONS

ISR PCT FR 2007 000951 dated Oct. 22, 2007.
International Search Report; PCT/FR2007/001678; May 14, 2008.

*Primary Examiner* — Edward Look
*Assistant Examiner* — Jesse Prager
(74) *Attorney, Agent, or Firm* — Brinks Gilson & Lione

(57) ABSTRACT

The nacelle of the invention includes an air-inlet front section, a middle section for encasing the fan of the turbofan (7) and a rear section including means for connection to a pylon to be connected to the rigid structure or an airplane. The rear section includes a structural framework (18) having at least one aerodynamic smoothing and acoustic panel (21). The acoustic panel (21) is secured on the structural framework (18) by floating or elastic fixation means so that said acoustic panel (21) can be deformed in a direction (31) essentially centrifugal and radial relative to the turbofan (7) in the presence of overpressure air (3) in the engine compartment.

8 Claims, 8 Drawing Sheets

(56) References Cited

U.S. PATENT DOCUMENTS

| | | |
|---|---|---|
| 7,740,200 B2 | 6/2010 | Diochon et al. |
| 7,806,363 B2 | 10/2010 | Udall et al. |
| 7,971,825 B2 | 7/2011 | Diochon et al. |
| 2006/0034679 A1* | 2/2006 | Harding et al. ............... 415/115 |
| 2006/0102419 A1* | 5/2006 | Mitchell et al. ............... 181/200 |

* cited by examiner

DEFORMABLE STRUCTURAL FRAMEWORK FOR A TURBOFAN NACELLE

FIELD OF THE INVENTION

The present invention relates to a nacelle for a bypass turbofan.

BACKGROUND OF THE INVENTION

An aircraft is propelled by several turbofans, each housed in a nacelle also accommodating a set of accessory actuation devices associated with its operation, such as a thrust-reverser device, and performing various functions when the turbofan is in operation or stopped.

A nacelle usually has a tubular structure comprising an air intake upstream of the turbofan, a mid-section designed to surround a fan of the turbofan, a downstream section accommodating thrust-reverser means and designed to surround the combustion chamber of the turbofan, and is usually terminated by an exhaust nozzle the outlet of which is situated downstream of the turbofan.

Modern nacelles are designed to accommodate a bypass turbofan capable of generating, via the air foils of the fan in rotation, a flow of hot air (also called the main flow) originating from the combustion chamber of the turbofan, and a flow of cold air (the bypass flow) which travels outside the turbojet through an annular passageway, also called the stream, formed between a fairing of the turbofan (or an internal structure of the downstream structure of the nacelle and surrounding the turbofan) and an internal wall of the nacelle. The two air flows are discharged from the turbofan through the rear of the nacelle.

Each propulsive assembly of the aircraft is therefore formed by a nacelle and a turbofan, and is suspended from a fixed structure of the aircraft, for example beneath a wing or on the fuselage, by means of a mast attached to the turbofan in its front and rear portion by suspension elements.

In such a configuration, it is the turbofan which supports the nacelle. Such an architecture is subjected to many combined external forces during the mission of the aircraft. Amongst other things this includes forces resulting from gravity, external and internal aerodynamic forces, gushes of wind, and thermal effects.

These stresses applied to the propulsive assembly are transmitted to the turbofan and cause deformations of the casings which directly impact the efficiency of the various stages of the turbofan. More particularly, in the case of a propulsive assembly called wasp-waist, that is to say having a long and relatively thin downstream portion relative to the intermediate structures and air intake, these stresses result in a particularly harmful deformation called "banana effect", the downstream portion bending considerably.

Such a "banana effect" results in a deformation of the external structure of the nacelle formed by the various successive casings while the drive shaft, the blades of the fan and the internal blades of the turbofan remain rectilinear. The result of this is that the heads of the blades of the shaft come closer to the internal periphery of the casings. The general performance of the turbofan is thereby reduced relative to a configuration in which the casings sustain very little or no deformations, because it is then necessary to take account of this deformation in the design of the nacelle so as always to arrange a sufficient clearance between the heads of the blades and the periphery of the casings. This results in a portion of the supply air which is not compressed by the blades because it escapes through this considerable clearance.

A solution to this problem has been proposed in the as yet unpublished French patent application registered under number 06.05912 in the name of the applicant. FIGS. 1 and 2 of the appended drawing summarize the subject of this document FR 06.05912.

The nacelle 1 illustrated in these figures is called structural, that is to say that it supports the engine 7 and connects it directly to a fixed structure 2 of an aircraft via a mast 15 incorporated into its build. The rear section of the nacelle comprises an internal structural framework 18 consisting of radial frames 20 associated with uprights 22; longitudinal reinforcements 26, 27 associated with upper longitudinal structures 23 and lower longitudinal structures 24 complete this structure. In addition, a set of thrust-absorbing link rods 29 help with transferring the forces from the engine 7 to the fixed structure 2 of the aircraft. An aerodynamic and acoustic smoothing panel 21 is mounted on the framework 18 and surrounds the engine 7.

For a such a structural framework design to be able to be certified by the certification authorities and to be perfectly dimensioned with no other random reinforcement means, it is necessary to dissociate the acoustic panel from the transfer of the forces from the engine to the aircraft. In addition, the structure of the acoustic panel and the surrounding structure must not be too impacted if the pipework of the engine were to burst.

BRIEF DESCRIPTION OF THE INVENTION

The present invention achieves these objectives and consists for this purpose in a nacelle for a bypass turbofan comprising a front air-intake section, a mid-section designed to surround a fan of the turbofan and a rear section having means for coupling to a mast designed to be connected to a fixed structure of an aircraft, said rear section comprising a structural framework onto which is mounted at least one aerodynamic and acoustic smoothing panel, wherein said acoustic panel is attached to the structural framework by floating or elastic attachment means, so as to allow the acoustic panel to deform in a substantially centrifugal radial direction relative to the turbofan in the presence of over pressurized air in the engine compartment. Therefore, the acoustic panel does not transmit forces originating from the turbofan to the fixed structure of the aircraft.

Said attachment means may comprise a nut facing a hole passing through the structural framework, and designed to receive and retain the shank of a screw mounted in a reinforcing bush housed in a hole passing through the acoustic panel.

In one embodiment, the reinforcing bush comes into direct contact with the structural framework, and the screw is mounted with a slight clearance in the reinforcing bush and has a nonconical head, so as to produce a floating attachment of the acoustic panel to the structural framework.

In another embodiment, the reinforcing bush is associated with an elastic ring which comes into contact with the structural framework.

In yet another embodiment, said nut comprises a base attached to the structural framework and having a housing in which the nut itself is mounted so as to move in translation on the axis of said hole passing through the structural framework, a return spring being provided in this housing in order to return the nut itself to a rest position at a distance from the structural framework. These arrangements, by playing on the stiffness of the spring or the tightness of the screw, make it possible to modulate the attachment of the panel to the framework in order, if necessary, to discharge internal over pressurized air.

The acoustic panel may be in one piece or formed of several elements. This includes the adaptation of the panel to an internal fixed structure comprising bifurcations or its application to a structure of the O-duct type.

According to one possibility, a heat-protection mat, designed to be interposed between the structural framework and the acoustic panel, is mounted by means of retention elements on the acoustic panel. Therefore, the panel incorporates its own heat protection.

The acoustic panel may comprise at least two longitudinal slots for discharging the over pressurized air in the nacelle. In this case, the heat-protection mat may have, in the vicinity of the discharge slots a tile-like overlap capable of allowing a deformation of the panel without affecting the heat protection.

According to another aspect of the invention, the panel may comprise at least one inspection hatch with rectilinear or scalloped cutouts. Peripheral seals are for example associated with the cutouts of the inspection hatch or hatches.

BRIEF DESCRIPTION OF THE DRAWINGS

The application of the invention will be better understood with the aid of the detailed description that is given below with respect to the appended drawing in which:

FIGS. 11b, 12 and 13 represent three operating configurations of a fifth example of an attachment device similar to that of FIG. 11a;

Figure 1:
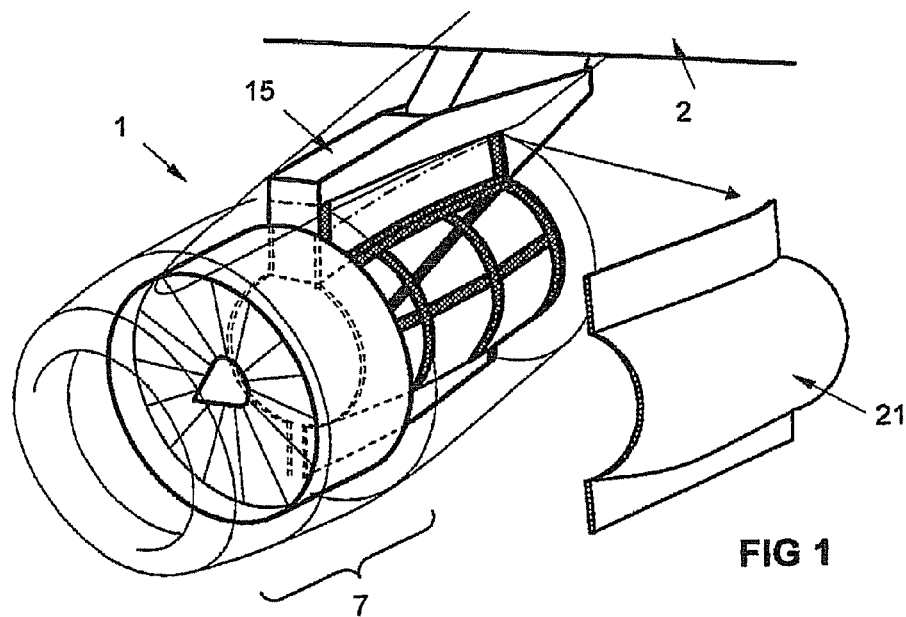
FIG. 1 (already commented on in the introduction) is a schematic view in perspective of a nacelle according to the prior art.
Figure 2:
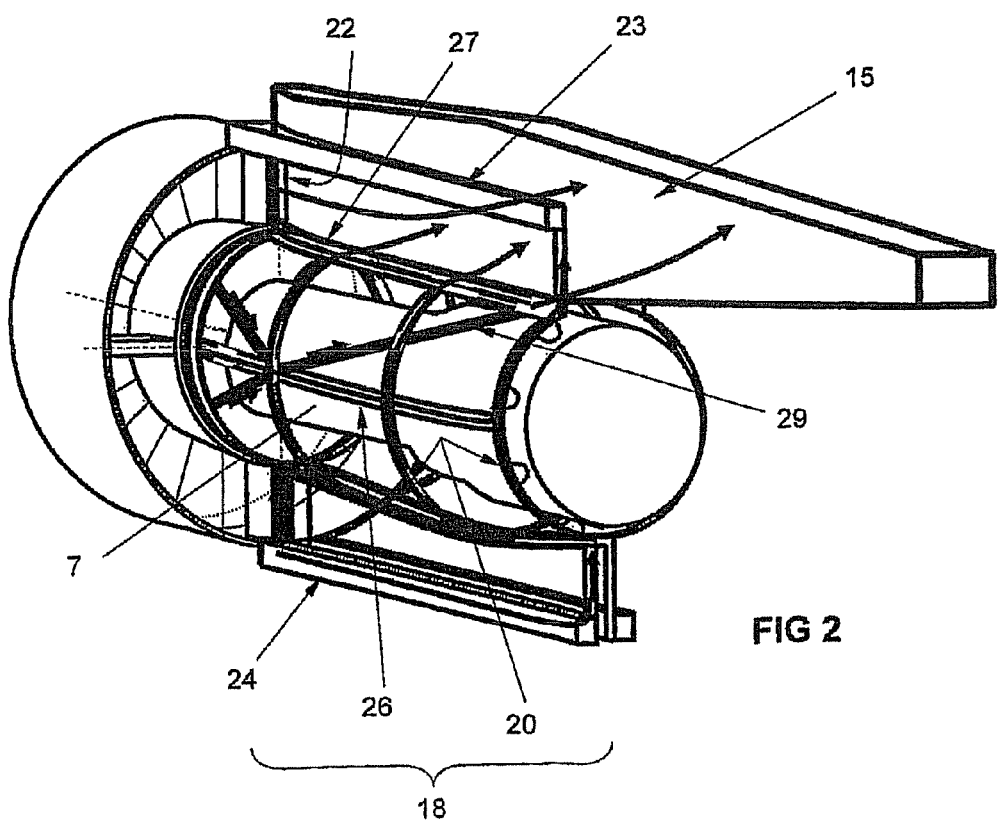
FIG. 2 (already commented on in the introduction) is a schematic view in perspective, from another angle, of the same nacelle.
Figure 3:
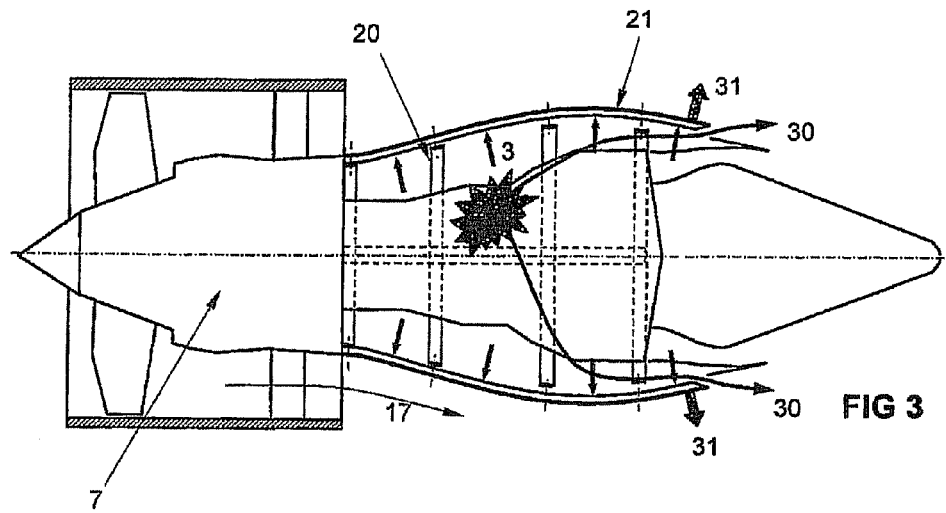
FIG. 3 is a view in partial longitudinal section of an example of a nacelle according to the invention, which illustrates the behavior of the structure of an acoustic panel if the pipe work of the engine should burst.

Certain elements represented in FIGS. 3 to 16 are similar to elements in FIGS. 1 and 2 and are designated by the same reference numbers. The nacelle according to the invention differs essentially from that illustrated in FIGS. 1 and 2 in that the acoustic panel 21 is attached to the structural framework 18 by floating or elastic attachment means.

DETAILED DESCRIPTION OF THE PREFERRED EMBODIMENTS

If pipe work of the engine 7 were to be burst for example (see FIG. 3), the panel 21 sustains a uniform pressure 3 over the whole inside of its structure and, by virtue of its floating or elastic attachment means to the framework 18, deforms in a substantially centrifugal radial direction 31 in the direction of an expansion of its internal volume in order to discharge the over pressurized air 30 in the engine compartment through the rear of the panel 21, without damaging the structure of the nacelle 1 and the engine 7. Therefore, the panel 21 does not transmit forces originating from the turbofan 7 to the fixed structure 2 of the aircraft. The upstream attachment of the panel 21 to the structure of the engine 7 remains sufficiently compact so as not to scoop the air 17 coming from the fan into the engine compartment and to amplify the harmful effect of the pressurization.

FIGS. 4 to 7 show exemplary embodiments of the acoustic panel 21, in which the panel 21 consists of a central shroud and upper and lower vertical panels. The acoustic panel 21 could also consist of only one shroud, or of a shroud associated with an upper or lower vertical panel.

Figure 4:
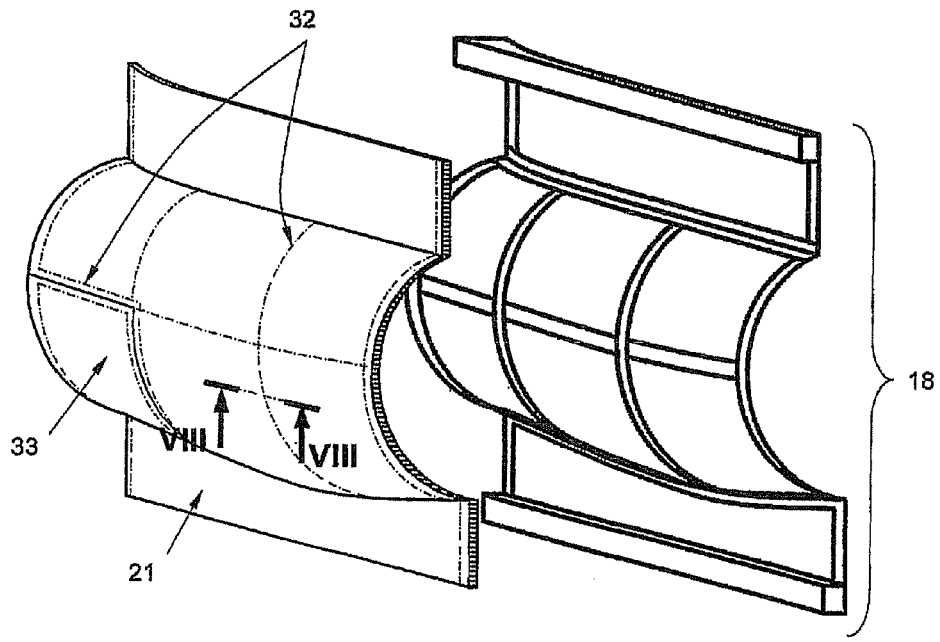
FIGS. 4 to 6 are similar views in perspective of a first, a second and a third exemplary embodiments of said acoustic panel.

The lines of attachment 32 of the panel 21 of FIG. 4 are situated opposite structural elements of the framework 18. The number and location of the attachments are defined by those skilled in the art according to the dimensional and geometric requirements of the overall structure.

In order to provide rapid and targeted maintenance on the engine 7, a removable inspection hatch 33 forms an upstream portion of the panel 21. The hatch 33 is situated in a zone of the engine 7 to be inspected.

Figure 5:
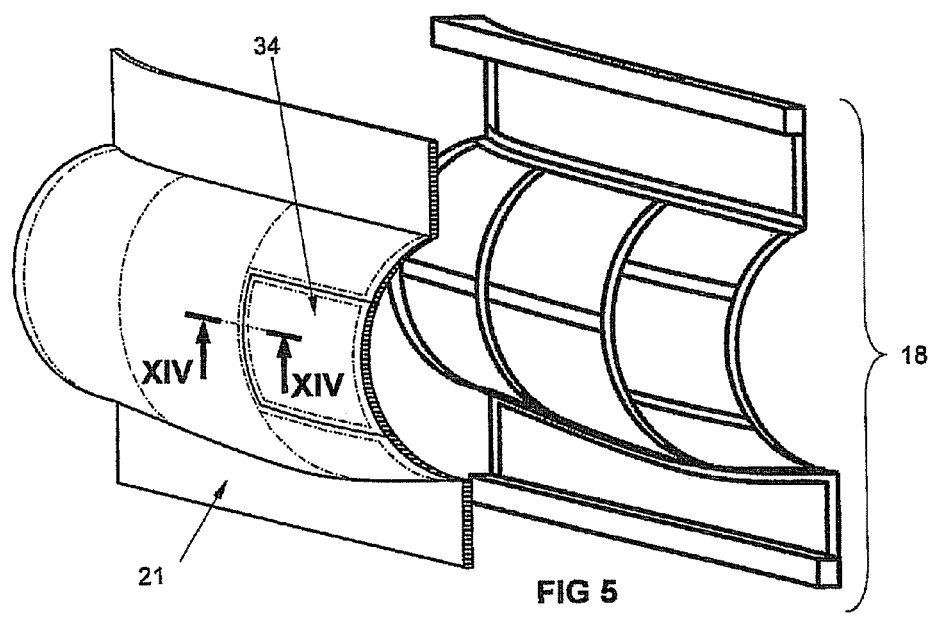

In FIG. 5, the acoustic panel 21 comprises an inspection hatch 34 which is situated downstream and which may serve as an overpressure hatch and for this purpose may comprise elastic attachments that are more flexible than for the rest of the acoustic panel 21 in order to promote the venting of air in this zone.

Figure 6:
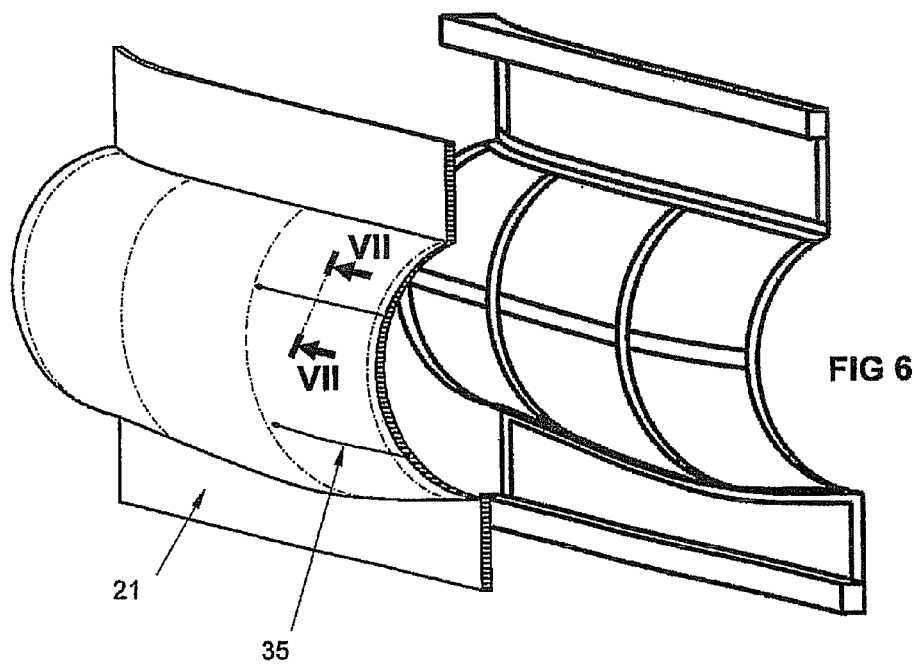

FIG. 6 represents an acoustic panel 21 comprising downstream two longitudinal slots 35 designed to discharge the over pressurized air in the nacelle. The slots 35 comprise seam abutments at the end. These slots 35 are placed and oriented at the convenience of those skilled in the art, with no requirement for overlapping with the structural elements of the framework 18.

Figure 7:
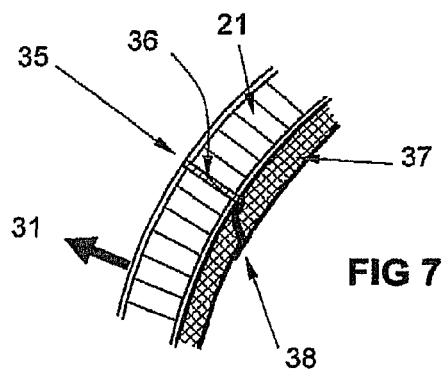
FIG. 7 is a view in section on the line VII-VII of FIG. 6.

FIG. 7 shows an exemplary embodiment of a slot 35. A seal 36 is associated with it. A heat-protection mat 37 designed to be interposed between the structural framework 18 and the acoustic panel 21, is mounted on the acoustic panel 21. The mat 37 has, in the vicinity of the discharge slot 35, a tile-like overlap 38 designed to allow a local deformation of the panel 21 without affecting the heat protection. Therefore, it is sufficient to provide elastic attachments downstream of the slots 35 in order to allow the opening, by deformation in the direction 31, of the region delimited by the two slots 35 of the panel 21.

Figure 8:
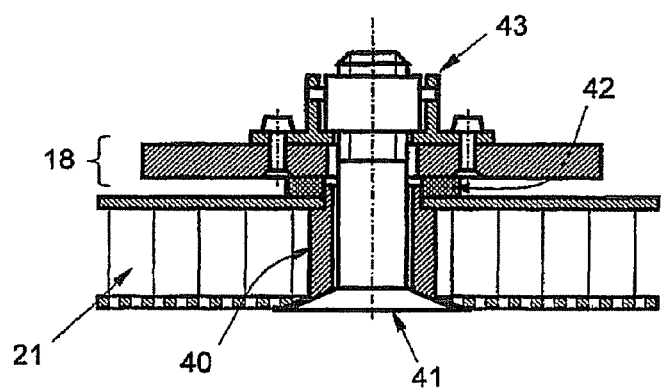
FIGS. 8, 9, 10 and 11a are similar views, in section on the line VIII-VIII of FIG. 4, of a first, a second, a third and a fourth examples of a device for attaching the acoustic panel to a structural framework of the nacelle.

FIG. 8 represents a device for the flexible attachment of the acoustic panel 21 to the framework 18. In this example, the acoustic panel 21 requires no heat protection because it is made of titanium.

This elastic attachment device comprises a nut 43 attached opposite a hole passing through the structural framework 18 and designed to receive and retain the shank of a screw 41 mounted in a local reinforcing bush 40 housed in a hole passing through the acoustic panel 21. The reinforcing bush 40 is associated with an elastomer washer 42 interposed between the panel 21 and the structural framework 18.

The reinforcing bush 40 makes it possible to prevent the screw 41 from crushing the internal structure of the panel 21. The bush 40 could also be incorporated into the very structure of the panel 21 by means of a "honeycomb" cell filler product forming the panel 21.

Figure 9:
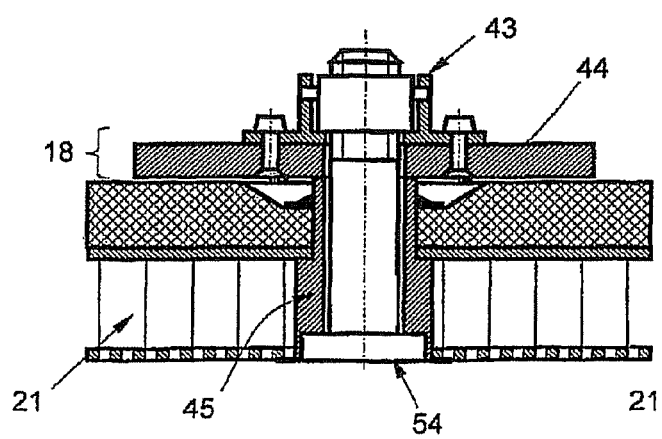

FIG. 9 represents a second example of the device for attaching the acoustic panel 21 to the framework 18. As in FIG. 8, a nut 43 is attached facing a hole passing through the structural framework 18, and designed to receive and retain the shank of a screw 54 mounted in a reinforcing bush 45 housed in a hole passing through the acoustic panel 21. In this instance, however, the screw 54 is mounted with a slight clearance in the reinforcing bush 45 and has a nonconical head, so as to achieve a floating, nonelastic attachment of the acoustic panel 21 to the structural framework 18.

This type of attachment may be employed for an acoustic panel requiring no heat protection, or else requiring heat protection provided by an aluminum panel 37.

The bush 45 in this instance is not associated with an elastic element but comes into direct contact with the framework 18. An annular recess is made in the heat-protection mat 37 around this bush 45; a tooth lockwasher 44 placed in this annular recess holds the mat 37 on the panel 21.

Figure 10:
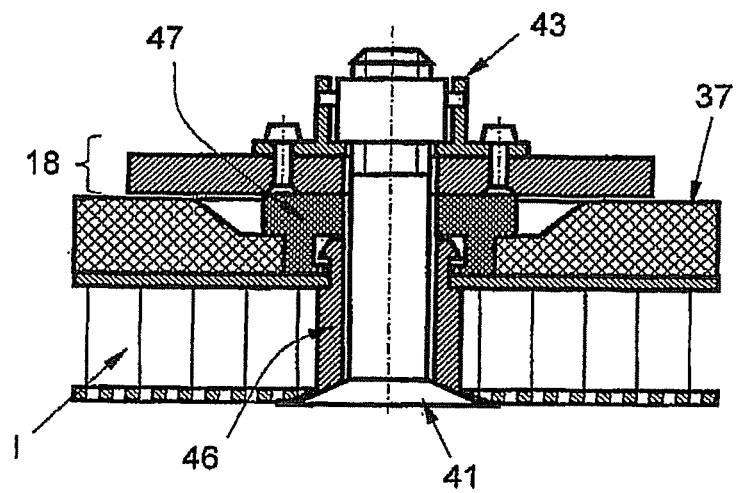

The elastic attachment device illustrated in FIG. 10 differs from the previous one in that the reinforcing bush 46 has, at one end, one or more lugs for the retention of an elastic ring 47 interposed between the panel 21 and the structural framework 18. The elastic ring 47 also has an annular shoulder designed to hold the mat 37 against the panel 21.

FIGS. 11*a*, 11*b*, 12 and 13 represent another elastic attachment device comprising a nut assembly, the base 50 of which is attached to the structural framework 18 facing a hole passing through the latter. The base 50 has a housing in which the nut itself 48*a* or 48*b* is mounted so as to be able to move in translation along the axis of the hole passing through the structural framework 18. A return spring 49 is provided in this housing to return the nut 48*a* or 48*b* to a rest position (see FIGS. 11*a* and 11*b*) at a distance from the structural framework 18.

As above, the nut 48*a* or 48*b* is designed to receive and retain the shank of a screw 41 mounted in a reinforcing bush 47 housed in a hole passing through the acoustic panel 21. In this instance, the reinforcing bush 47 is incorporated into the acoustic panel 21. Depending on the stiffness of the spring 49, a hold that is more rigid (for example upstream of the panel 21) or less rigid (for example downstream of the panel 21) of the nut assembly may be obtained.

Figure 11A:
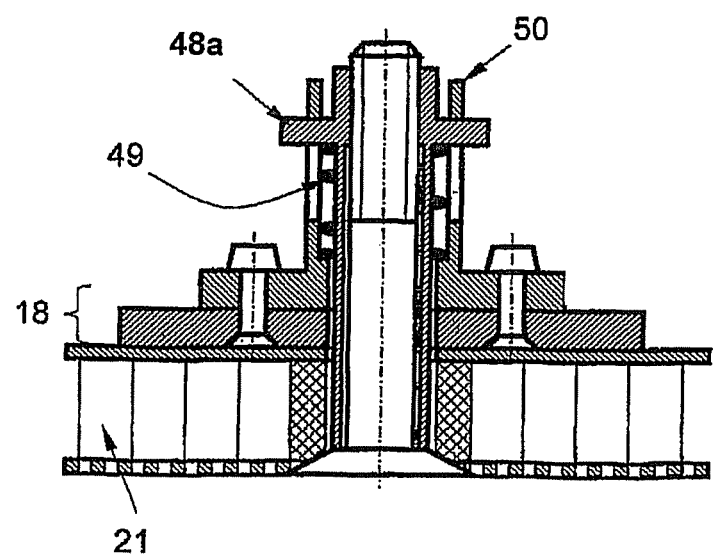

In FIG. 11*a*, a tightening abutment of the screw 41 is incorporated into the nut 48*a*. It is sufficient to tighten up to contact in order to ensure a good installation. To ensure the necessary differential tension, the spring 49 may have several stiffness levels, or the nut 53 may have different lengths.

Figure 11B:
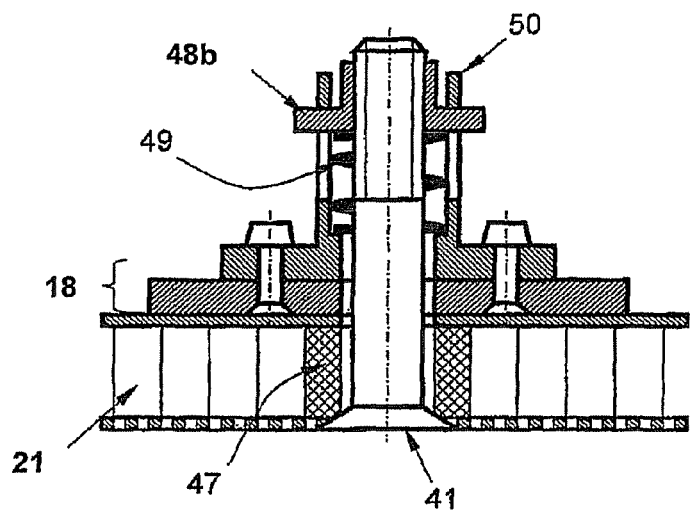
Figure 12:
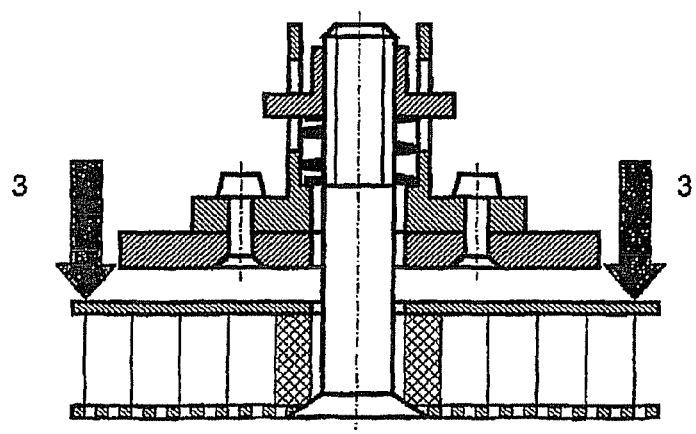
Figure 13:
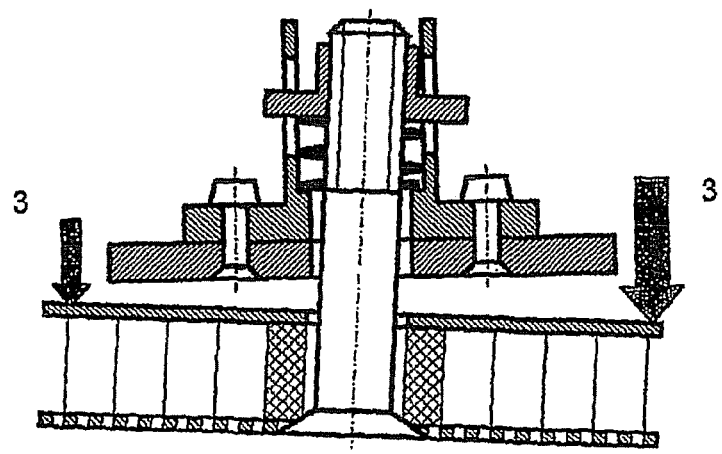

In FIG. 11*b*, the nut 48*b* does not have a tightening abutment of the screw 41. Mounting the screw 41 by acting on the tightening torque tends to give more or less tension to the spring 49 in the rest position and therefore allows the differential movement of the panel 21 under pressure.

In the case of overpressure, the acoustic panel 21 sustaining the air pressure in the direction of the arrows 3 (see FIGS. 12 and 13) moves away from the framework 18 and the nut 48*b*, pulled by the screw 41, slides in its housing made in the base 50, against the return action of the spring 49.

Figure 14:
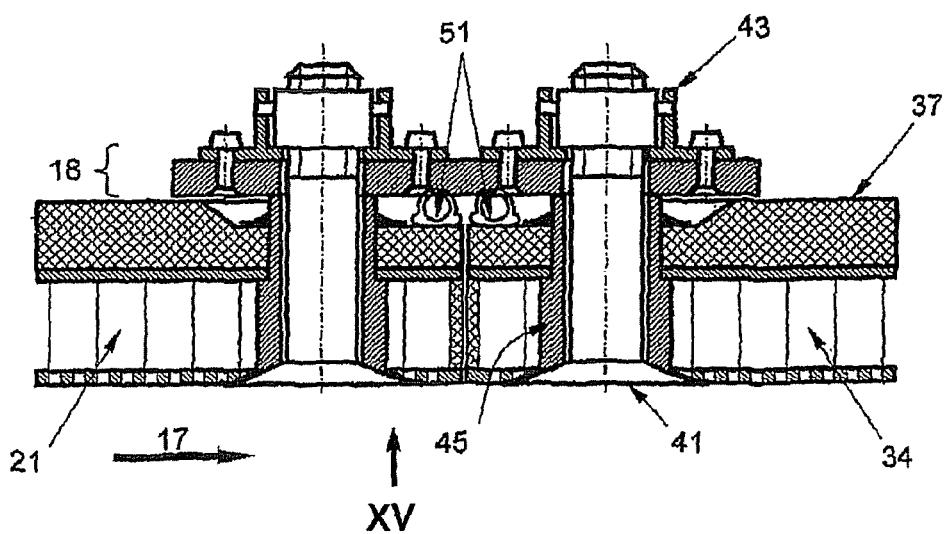
FIG. 14 is a view in section on the line XIV-XIV of FIG. 5.

FIG. 14 represents a junction zone between the panel 21 and its inspection hatch 34. Two peripheral seals 51 are mounted between the structural framework 18 and the heat-protection mat 37 on either side of this junction zone, in order to insulate it from the air flow 17 originating from the fan of the engine 7.

Figure 15:
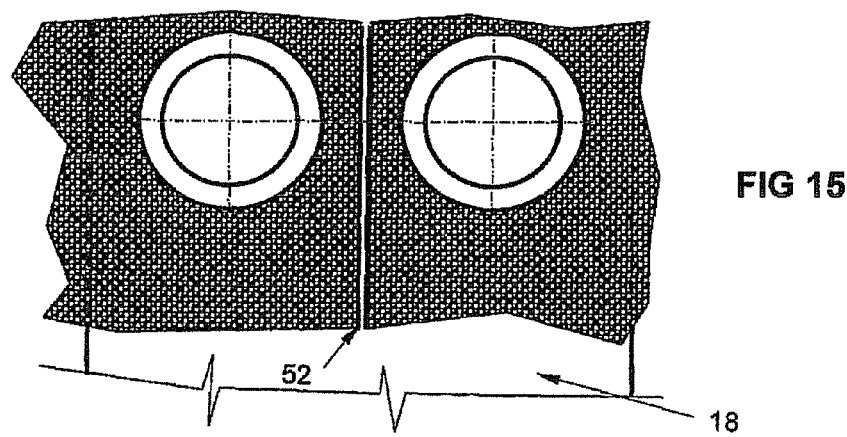
FIGS. 15 and 16 are views in the direction of the arrow XV of FIG. 14 which illustrate two examples of the cutout of an inspection hatch in the acoustic panel.
Figure 16:
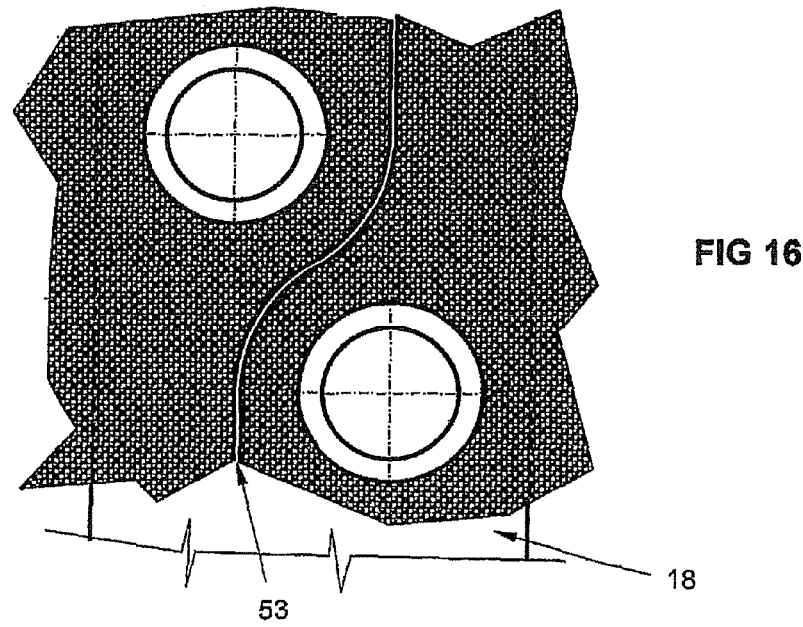

As indicated in FIGS. 15 and 16, the cutouts 52 or 53 of the inspection hatch 34 in the panel 21 may be rectilinear (52) with a functional clearance for mounting, or scalloped (53) to optimize the width of the framework 18.

Although the invention has been described with particular exemplary embodiments, it is evident that it is in no way limited thereto and that it comprises all the technical equivalents of the means described and their combinations if the latter enter the scope of the invention.

The invention claimed is:

1. A nacelle for a bypass turbofan comprising a front air-intake section, a mid-section designed to surround a fan of the turbofan and a rear section having means for coupling to a mast designed to be connected to a fixed structure of an aircraft, said rear section comprising a structural framework onto which is mounted at least one aerodynamic and acoustic smoothing panel, wherein said acoustic panel is not fixed and is attached to the structural framework by floating or elastic attachment means, so as to allow the acoustic panel to deform in a substantially centrifugal radial direction relative to the turbofan in the presence of over pressurized air in an engine compartment, wherein said floating or elastic attachment means comprise a nut facing a hole passing through the structural framework, and designed to receive and retain a shank of a screw mounted in a reinforcing bush housed in a hole passing through the acoustic panel, wherein said nut comprises a base attached to the structural framework and having a housing in which the nut itself is mounted so as to move in translation on an axis of said hole passing through the structural framework, the elastic attachment means comprising a return spring being provided in this housing in order to return the nut itself to a rest position at a distance from the structural framework.

2. The nacelle as claimed 1, wherein the reinforcing bush comes into direct contact with the structural framework, and wherein the screw is mounted with a slight clearance in the reinforcing bush and has a nonconical head, so as to produce the floating attachment means.

3. The nacelle as claimed in claim 1, wherein the elastic attachment means comprises an elastomeric ring interposed between the panel and the structural framework.

4. A nacelle for a bypass turbofan comprising a front air-intake section, a mid-section designed to surround a fan of the turbofan and a rear section having means for coupling to a mast designed to be connected to a fixed structure of an aircraft, said rear section comprising a structural framework onto which is mounted at least one aerodynamic and acoustic smoothing panel, wherein said acoustic panel is not fixed and is attached to the structural framework by floating or elastic attachment means, so as to allow the acoustic panel to deform in a substantially centrifugal radial direction relative to the turbofan in the presence of over pressurized air in an engine compartment, wherein a heat-protection mat, designed to be interposed between the structural framework and the acoustic panel, is mounted by means of retention elements on the acoustic panel.

5. A nacelle for a bypass turbofan comprising a front air-intake section, a mid-section designed to surround a fan of the turbofan and a rear section having means for coupling to a mast designed to be connected to a fixed structure of an aircraft, said rear section comprising a structural framework onto which is mounted at least one aerodynamic and acoustic smoothing panel, wherein said acoustic panel is not fixed and is attached to the structural framework by floating or elastic attachment means, so as to allow the acoustic panel to deform in a substantially centrifugal radial direction relative to the turbofan in the presence of over pressurized air in an engine compartment, wherein the acoustic panel comprises at least two longitudinal slots for discharging the over pressurized air in the nacelle.

6. The nacelle as claimed in claim 4, wherein the heat-protection mat has, in a vicinity of at least two discharge slots, a tile-like overlap capable of allowing a deformation of the acoustic panel without affecting heat protection.

7. The nacelle as claimed in claim 5, wherein the acoustic panel comprises at least one inspection hatch with rectilinear cutouts or scalloped cutouts.

8. The nacelle as claimed in claim 7, wherein peripheral seals are associated with the cutouts of the inspection hatch or hatches.

\* \* \* \* \*